April 5, 1927.

A. TICHOTA

ADJUSTABLE SEAT

Filed Oct. 8, 1926

1,623,818

August Tichota
Inventor
By C A Snow & Co.
Attorneys

Patented Apr. 5, 1927.

1,623,818

UNITED STATES PATENT OFFICE.

AUGUST TICHOTA, OF DODGE, NEBRASKA.

ADJUSTABLE SEAT.

Application filed October 8, 1926. Serial No. 140,320.

This invention relates to an adjustable seat designed primarily for use in connection with riding harrows and other agricultural machines, tractors and the like.

One of the objects of the invention is to provide a seat the width of which can be adjusted readily so that the seat can be occupied comfortably by persons of different sizes.

A further object is to provide a structure of this character which is simple and compact and which can be adjusted readily.

With the foregoing and other objects in view which will appear as the description proceeds, the invention resides in the combination and arrangement of parts and in the details of construction hereinafter described and claimed, it being understood that changes in the precise embodiment of the invention herein disclosed may be made without departing from the spirit of the invention.

In the accompanying drawings the preferred form of the invention has been shown.

In said drawings.

Figure 1:
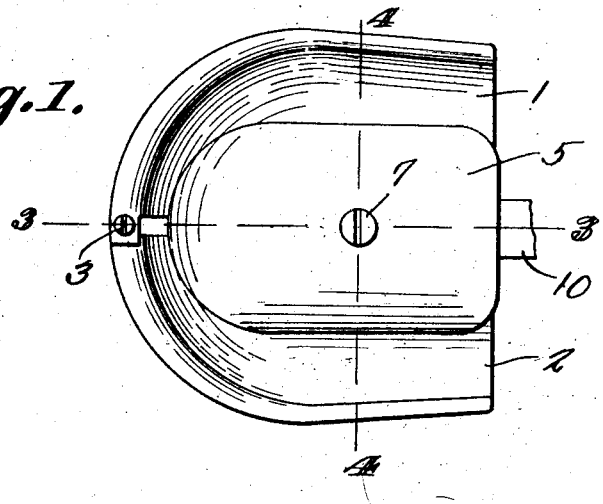
Figure 1 is a top plan view of the seat.
Figure 2:
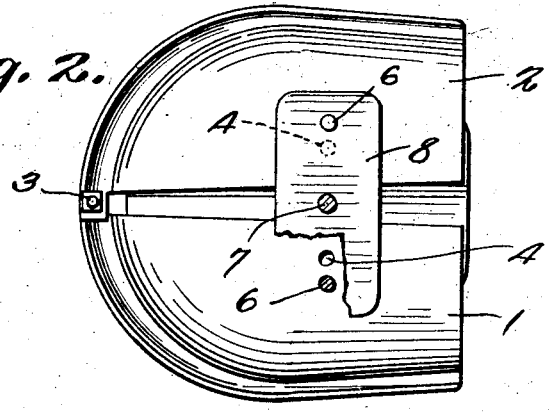
Figure 2 is a bottom plan view, a portion being broken away.
Figure 3:
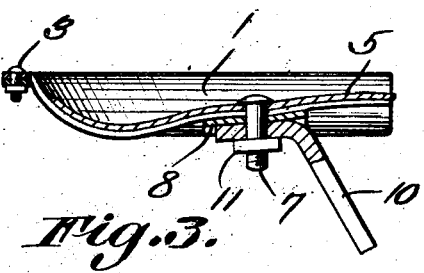
Figure 3 is a section on line 3—3, Figure 1.
Figure 4:
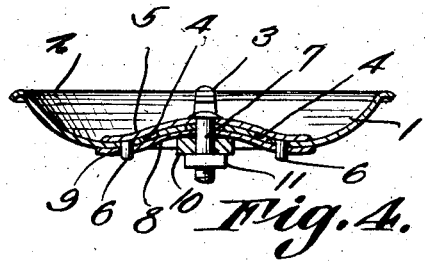
Figure 4 is a section on line 4—4, Figure 1.

Referring to the figures by characters of reference 1 and 2 designate opposed sections of the seat, these being preferably formed of sheet metal although it is to be understood that they can be made of any other material desired. The sections have their side and back edges properly shaped and are pivotally connected where their back edge portions meet as shown at 3 so that the two sections can thus be adjusted angularly relative to each other to increase or reduce the width of the seat.

Formed in the seat adjacent the center of each section are apertures 4 disposed in separate groups and bridging the inner edges of the sections 1 and 2 is a cover plate 5 provided near its side edges, with depending lugs 6. These lugs are adapted to extend through selected openings in the two sections 1 and 2, thereby to hold the sections against movement toward or from each other. A clamping bolt 7 is extended through the cover plate and between sections 1 and 2, this bolt also extending through a tie plate 8 which fits snugly against the bottom faces of the sections 1 and 2 and has apertures 9 for the reception of the lugs 6. Bolt 7 has its upper end or head rounded or, if desired, this head can be countersunk within the cover plate 5. In other words the arrangement of the head is such as not to cause discomfort to the occupant of the seat. Bolt 7 is extended through the supporting standard 10 arranged under the tie plate 8 and by tightening a nut 11 on the bolt the seat will not only be held securely to the standard but the sections 1 and 2 will be tightly gripped between plates 5 and 8.

It will be apparent that when it is desired to adjust the seat to a greater or less width, it becomes merely necessary to loosen bolt 7 so as to permit withdrawal of the lugs 6 from the apertures 4. The sections 1 and 2 are then adjusted toward or from each other, the parts are replaced and tightened and the seat is ready for use.

What is claimed is:

1. A seat including pivotally connected sections oppositely disposed, a cover plate upon the sections, means upon the plate and adjustably connected to the respective sections for holding said sections at predetermined distances apart, and means for clamping the plate and sections together.

2. An adjustable seat including relatively movable oppositely disposed seat sections, a cover plate supported thereby, cooperating means upon the cover plate and sections for holding said sections at predetermined distances from each other, a support, and means engaging the support and cover plate for binding the plate, sections and support to hold them against relative movement.

3. An adjustable seat including opposed relatively movable seat sections, a cover plate resting removably thereon, means upon the plate and cooperating with the sections for holding said sections at predetermined distances from each other, a tie member extending under the sections, a support, and means engaging the cover plate and tie member for binding them upon the seat sections and for holding the sections fixed relative to the support.

4. An adjustable seat including opposed relatively movable seat sections, a cover plate thereon, depending lugs on the cover plate, there being apertures within the seat sections for the reception of the lugs, said lugs cooperating with the apertured sections for holding said sections at predetermined distances apart, a tie member extending under the sections and engaging the lugs, a support, and means extending through the cover plate and tie member and engaging the support for binding the parts together and to the support.

In testimony that I claim the foregoing as my own, I have hereto affixed my signature.

AUGUST TICHOTA.